United States Patent
Berry et al.

(10) Patent No.: US 11,262,074 B2
(45) Date of Patent: Mar. 1, 2022

(54) HGP COMPONENT WITH EFFUSION COOLING ELEMENT HAVING COOLANT SWIRLING CHAMBER

(71) Applicant: General Electric Company, Schenectady, NY (US)

(72) Inventors: Jonathan Dwight Berry, Simpsonville, SC (US); Michael Hughes, State College, PA (US); Srikanth Chandrudu Kottilingam, Greenville, SC (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 16/360,177

(22) Filed: Mar. 21, 2019

(65) Prior Publication Data

US 2020/0300165 A1    Sep. 24, 2020

(51) Int. Cl.
| | |
|---|---|
| *F23R 3/28* | (2006.01) |
| *F23R 3/00* | (2006.01) |
| *F01D 9/02* | (2006.01) |
| *F23R 3/06* | (2006.01) |

(52) U.S. Cl.
CPC .............. *F23R 3/283* (2013.01); *F01D 9/023* (2013.01); *F05D 2240/35* (2013.01); *F05D 2260/201* (2013.01); *F05D 2260/204* (2013.01); *F23R 3/002* (2013.01); *F23R 3/007* (2013.01); *F23R 3/06* (2013.01); *F23R 2900/03041* (2013.01); *F23R 2900/03042* (2013.01); *F23R 2900/03045* (2013.01)

(58) Field of Classification Search
CPC ............ F23R 3/283; F23R 2900/03041; F23R 2900/03042; F23R 2900/03043; F23R 2900/03044; F23R 2900/03045; F23R 3/002; F23R 3/02; F23R 3/04; F23R 3/045; F23R 3/06; F23R 3/16; F23R 3/18; F23R 3/26; F23R 3/12; F23R 2900/00004; F23R 2900/00005; F05D 2260/221–232; F05D 2260/14; F05D 2260/209; F05D 2260/2212; F05D 2260/20–232; F02C 7/18; F02C 7/12; F02C 7/185

See application file for complete search history.

(56) References Cited

U.S. PATENT DOCUMENTS

| | | | |
|---|---|---|---|
| 9,010,122 B2 | 4/2015 | Bangerter et al. | |
| 9,939,154 B2* | 4/2018 | Cunha | F23R 3/04 |
| 10,393,022 B2* | 8/2019 | Harding | F01D 25/12 |
| 10,787,998 B2* | 9/2020 | Watanabe | F23M 5/08 |

(Continued)

*Primary Examiner* — Stephanie Sebasco Cheng
(74) *Attorney, Agent, or Firm* — Hoffman Warnick

(57) ABSTRACT

An effusion cooling element for the surface of a hot gas path (HGP) component is disclosed. The effusion cooling element includes a coolant swirling chamber embedded within the body of the HGP component. A coolant delivery passage is in the body and configured to deliver a coolant to the coolant swirling chamber. The coolant swirling chamber imparts a centrifugal force to the coolant. An effusion opening is in the HGP surface and in fluid communication with the coolant swirling chamber, the effusion opening having a smaller width than the coolant swirling chamber. The coolant exits the effusion opening over substantially all of 360° about the effusion opening, creating a coolant film on the HGP surface.

18 Claims, 9 Drawing Sheets

(56) References Cited

U.S. PATENT DOCUMENTS

| | | | | |
|---|---|---|---|---|
| 11,085,643 B2* | 8/2021 | Freeman | ................ | B33Y 10/00 |
| 2010/0263386 A1* | 10/2010 | Edwards | ................ | F23R 3/002 |
| | | | | 60/796 |
| 2016/0230993 A1 | 8/2016 | Dai et al. | | |
| 2016/0281988 A1 | 9/2016 | Tu, Jr. et al. | | |
| 2017/0356652 A1* | 12/2017 | Singh | ..................... | F23R 3/002 |

* cited by examiner

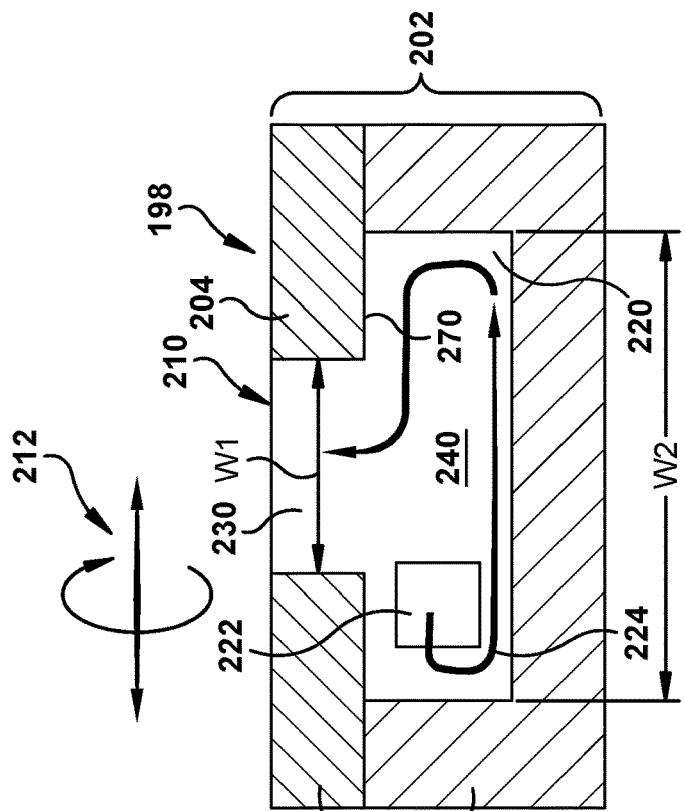
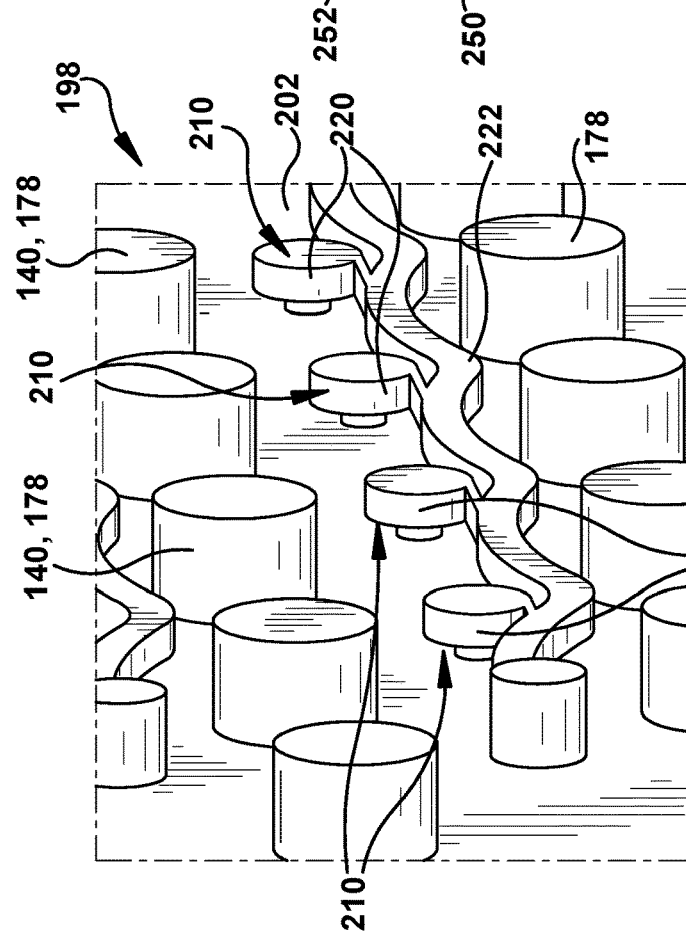

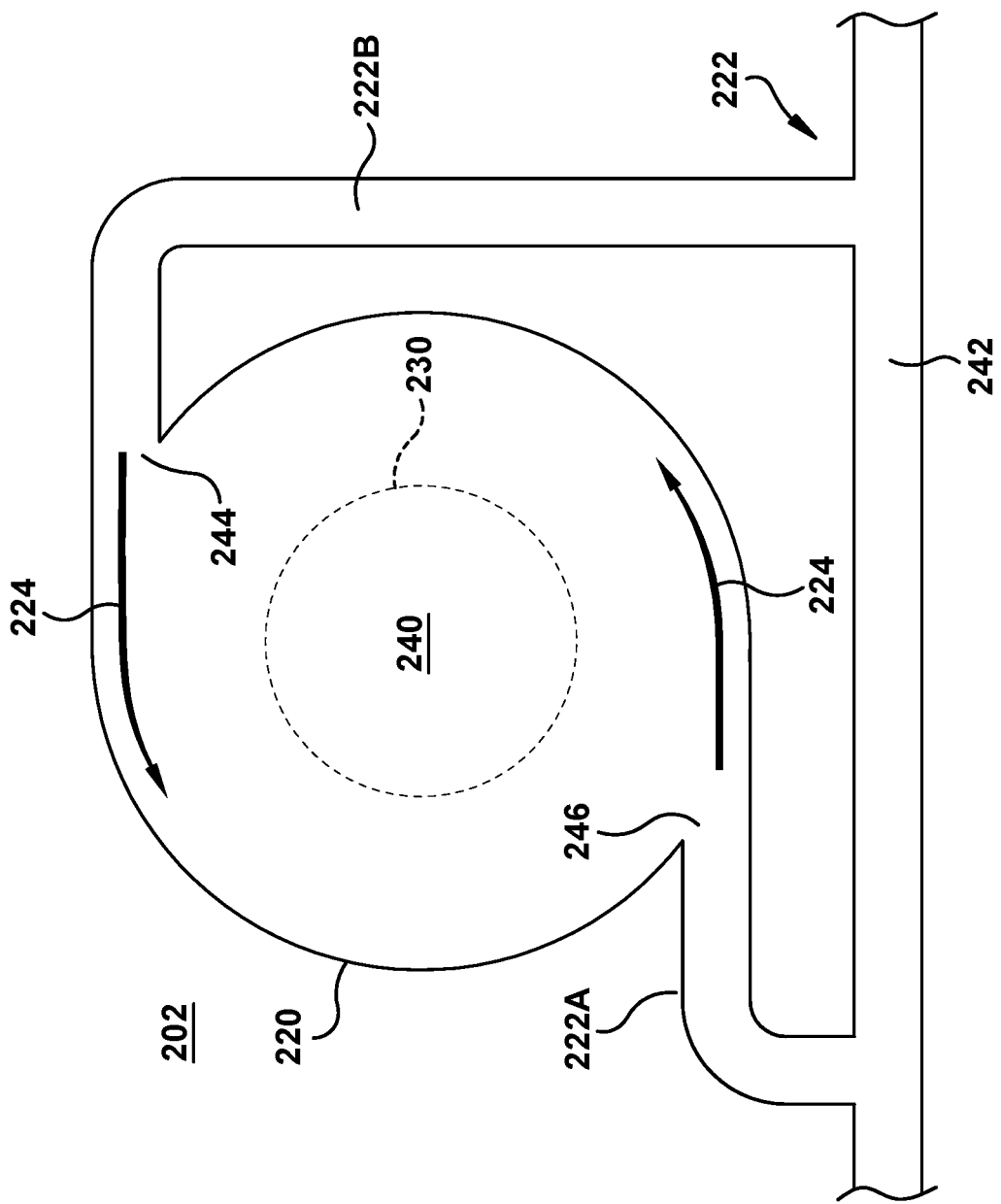

HGP COMPONENT WITH EFFUSION COOLING ELEMENT HAVING COOLANT SWIRLING CHAMBER

This application was made with government support under contract number DE-FE0023965 awarded by the Department of Energy. The US government has certain rights in the invention.

BACKGROUND OF THE INVENTION

The disclosure relates generally to hot gas path (HGP) components, and more particularly, to an HGP component with an effusion cooling element including a coolant swirling chamber directing a coolant film across substantially all of 360° from an effusion opening in a surface of the HGP component.

Gas turbine systems are used in a wide variety of applications to generate power. In operation of a gas turbine system ("GT system"), air flows through a compressor and the compressed air is supplied to a combustion section. Specifically, the compressed air is supplied to a number of combustors each having a number of fuel nozzles, i.e., burners, which use the air in a combustion process with a fuel. The compressor includes a number of inlet guide vanes (IGVs), the angle of which can be controlled to control an air flow to the combustion section, and thus a combustion temperature. The combustion section is in flow communication with a turbine section in which the combustion hot gasses' kinetic and thermal energy is converted to mechanical rotational energy. The turbine section includes a turbine that rotatably couples to and drives a rotor. The compressor may also rotatably couple to the rotor. The rotor may drive a load, like an electric generator.

The combustion section includes a number of combustors that can be used to control the load of the GT system, e.g., a plurality of circumferentially spaced combustor 'cans.' A header (or head end) combustion stage may be positioned at an upstream end of the combustion region of each combustor. The header combustion stage includes a number of fuel nozzles that introduce fuel for combustion. One form of fuel nozzle is referred to as a fuel-air micro-mixer and includes a number of spaced fuel-air micromixer tubes extend through a cap assembly plate to introduce fuel and air for combustion. Advanced gas turbine systems may also include a second combustion stage, referred to as an axial fuel staging (AFS) or late lean injection (LLI) combustion stage, downstream from the header combustion stage in the combustion region of each combustor. Components exposed to the hot gas path of the combusted fuel are referred to as hot gas path (HGP) components.

Current GT systems strive to operate at extremely high operating temperatures, e.g., >1370° C. (2500° F.), to achieve higher performance and lower emissions. Achieving adequate cooling of HGP components along the hot gas path becomes an increasing challenge at the higher temperatures. In particular, HGP components that include surfaces that face downstream of the hot gas path pose challenges because they are exposed to multiple recirculating flows of combustion gases that scrub and heat the metallic components. One example HGP component exposed to this situation includes the aft surface of the cap assembly plate for a fuel nozzle, e.g., fuel-air micro-mixer, in the header combustion stage. Regions of the cap assembly plate between the fuel nozzles, e.g., between fuel-air mixing tubes, and the perimeter edges of the cap assembly plate receive the highest exposure to high thermal loads. Conventionally, coolant is introduced to the hot gas path surface of the cap assembly plate using effusion openings in an attempt to place a coolant film on these surfaces. Current effusion openings introduce the coolant to the surface in a single direction, requiring a large number of openings in elaborate arrangements to cool as much as possible of the hot gas path surface. Current approaches always leave some regions uncooled or undercooled.

BRIEF DESCRIPTION OF THE INVENTION

A first aspect of the disclosure provides a hot gas path (HGP) component, comprising: a body including a hot gas path (HGP) surface exposed to a hot gas path; and an effusion cooling element in the body, the effusion cooling element including: a coolant swirling chamber embedded within the body, a coolant delivery passage in the body configured to deliver a coolant to the coolant swirling chamber, the coolant swirling chamber imparting a centrifugal force to the coolant, and an effusion opening in the HGP surface and in fluid communication with the coolant swirling chamber, the effusion opening having a smaller width than the coolant swirling chamber.

A second aspect of the disclosure provides a gas turbine (GT) system, comprising: a compressor; a combustion section including a plurality of combustors for creating a flow of hot gasses that travels along a hot gas path; a turbine section downstream of the combustion section, the turbine section receiving the flow of hot gasses; a hot gas path (HGP) component including a body including a hot gas path (HGP) surface exposed to the hot gas path; and an effusion cooling element in the body of the HGP component, the effusion cooling element including: a coolant swirling chamber embedded within the body, a coolant delivery passage in the body configured to deliver a coolant to the coolant swirling chamber, wherein the coolant delivery passage is in fluid communication with a source of pressurized coolant and the coolant swirling chamber imparts a centrifugal force to the coolant, and an effusion opening in the HGP surface and in fluid communication with the coolant swirling chamber, the effusion opening having a smaller width than the coolant swirling chamber, wherein the coolant exits the effusion opening over substantially all of 360° about the effusion opening, creating a coolant film on the HGP surface.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 7 shows a cross-sectional view of the effusion cooling element of FIG. 6 alone line A-A.

FIG. 8 shows a schematic negative view of the effusion cooling element, according to embodiments of the disclosure.

FIG. 9 shows a cross-sectional plan view of an effusion cooling element with two coolant delivery passages, according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
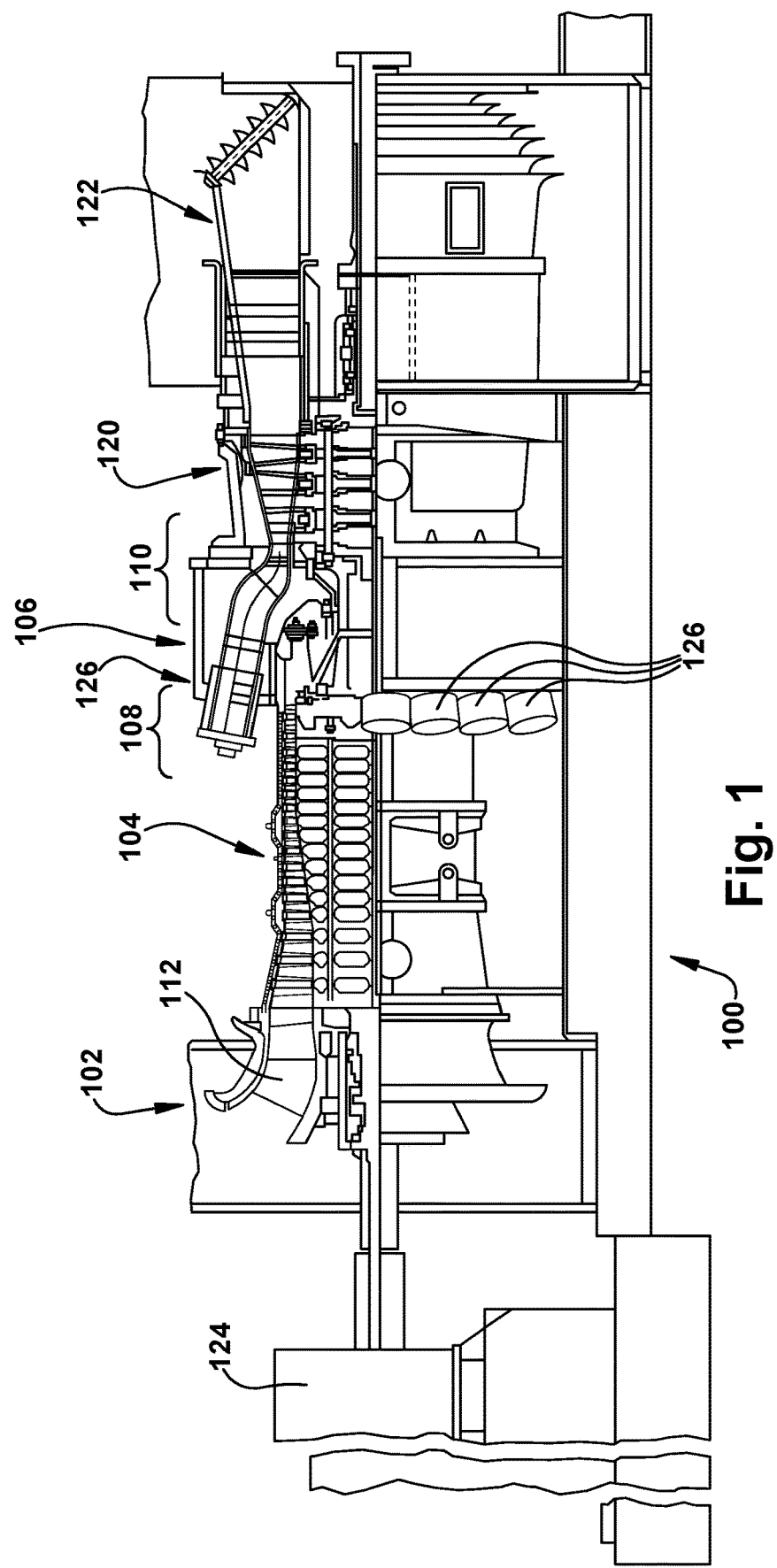
FIG. 1 shows a partial cross-sectional side view of a gas turbine system according to an embodiment of the disclosure.

As an initial matter, in order to clearly describe the current disclosure it will become necessary to select certain terminology when referring to and describing relevant machine components within a gas turbine (GT) system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. Unless explicitly stated as otherwise, what may be described herein as being a single part may include and be referenced in another context as consisting of multiple components. Alternatively, unless explicitly stated as otherwise, what may be described herein as including multiple components may be referred to elsewhere as including a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the combustion gas stream in a combustion section or, for example, the flow of air through the compressor. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

In the disclosure, where necessary to differentiate between numerous structures of the same nature, alphanumerical references may be employed (e.g., 172A, 172B), and where beneficial to refer to the structures collectively, just the numerical portion of the alphanumerical reference may be employed (e.g., 172).

As indicated above, the disclosure provides a hot gas path (HGP) component including an effusion cooling element. Embodiments also include a gas turbine (GT) system including the HGP component. The effusion cooling element includes a coolant swirling chamber embedded within the body of the HGP component. A coolant delivery passage is in the body and configured to deliver a coolant to the coolant swirling chamber. The coolant swirling chamber imparts a centrifugal force to the coolant. An effusion opening is in the HGP surface and in fluid communication with the coolant swirling chamber, the effusion opening having a smaller width than the coolant swirling chamber. The coolant can exit the effusion opening over substantially all of 360° about the effusion opening, creating a coolant film on the HGP surface. In this manner, HGP surface is more readily cooled in a uniform manner.

FIG. 1 shows a cross-sectional view of an illustrative GT system 100 in which teachings of the disclosure may be employed. In FIG. 1, GT system 100 includes an intake section 102, and a compressor 104 downstream from intake section 102. Compressor 104 feeds air to a combustion section 106 that is coupled to a turbine section 120. Compressor 104 may include one or more stages of inlet guide vanes (IGVs) 112. As understood in the art, the angle of stages of IGVs 112 can be controlled to control an air flow volume to combustion section 106, and thus, among other things, the combustion temperature of combustion section 106. Combustion section 106 includes a plurality of combustors 126. Each combustor 126 includes a primary combustion stage 108 including a first plurality of fuel nozzles, and may include a secondary combustion stage 110 downstream from primary combustion stage 108. Secondary combustion stage 110 includes a second plurality of fuel nozzles, different than the first plurality of fuel nozzles. Exhaust from turbine section 120 exits via an exhaust section 122. Turbine section 120 through a common shaft or rotor connection drives compressor 104 and a load 124. Load 124 may be any one of an electrical generator and a mechanical drive application and may be located forward of intake section 102 (as shown) or aft of exhaust section 122. Examples of such mechanical drive applications include a compressor for use in oil fields and/or a compressor for use in refrigeration. When used in oil fields, the application may be a gas reinjection service. When used in refrigeration, the application may be in liquid natural gas (LNG) plants. Yet another load 124 may be a propeller as may be found in turbojet engines, turbofan engines and turboprop engines.

Figure 2:
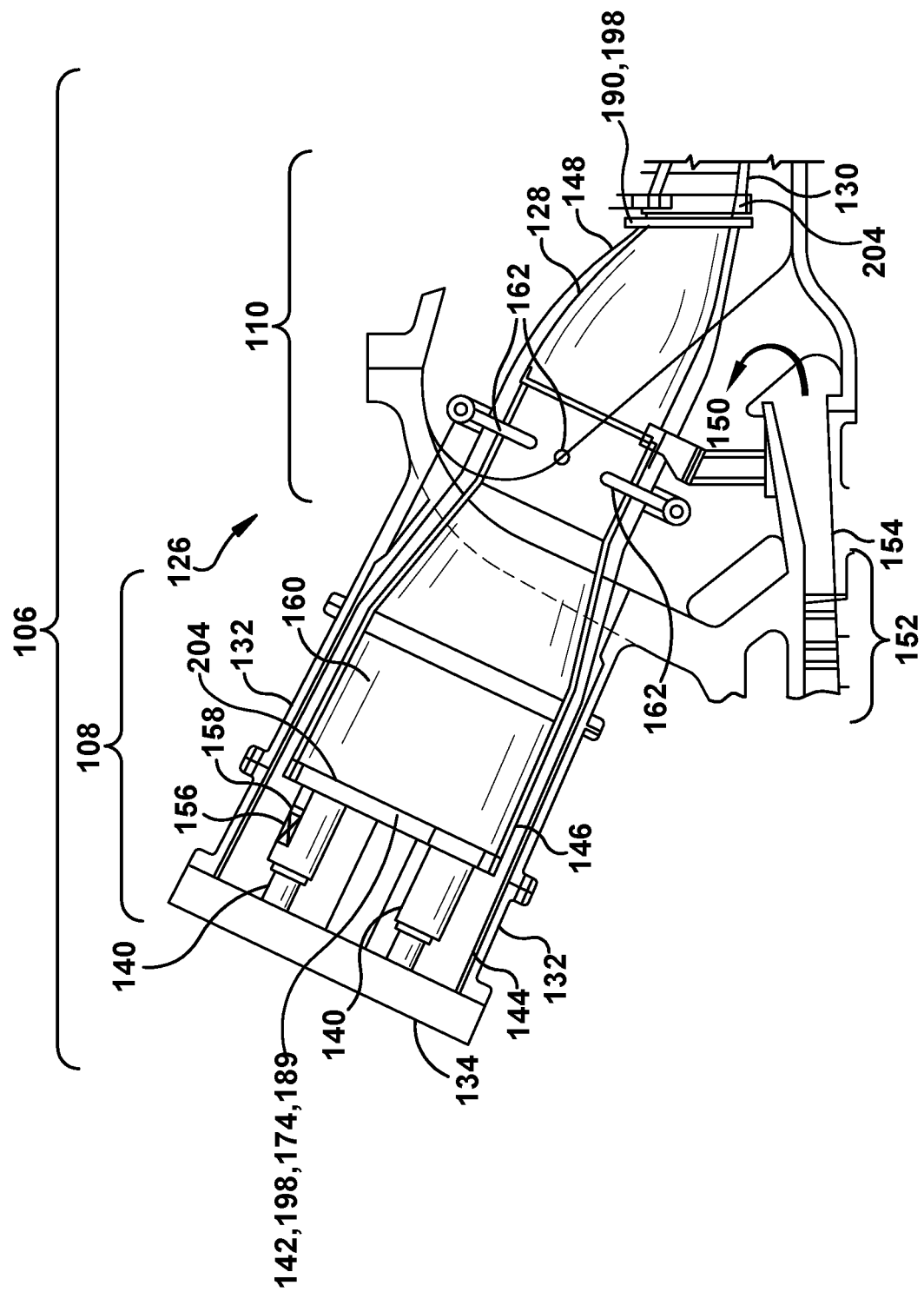
FIG. 2 shows a cross-sectional side view of a combustor for a combustion section useable in GT system of FIG. 1.

Referring to FIGS. 1 and 2, combustion section 106 may include a circular array of a plurality of circumferentially spaced combustors 126. FIG. 2 shows a cross-sectional side view of combustor 126. A fuel/air mixture is burned in each combustor 126 to produce the hot energetic combustion gas flow (hereinafter "hot gas" flow), which flows along a hot gas path, from a reaction zone 160 through a transition piece 128 to first stage turbine nozzles 130 of turbine section 120. For purposes of the present description, only one combustor 126 is illustrated, it being appreciated that all of the other combustors 126 arranged about combustion section 106 are substantially identical to the illustrated combustor 126. Although FIG. 1 shows a plurality of circumferentially spaced combustors 126 and FIG. 2 shows a cross sectional side view of a combustor 126 that have come to be known in the art as can combustor systems, it is contemplated that the present disclosure may be used in conjunction with other combustor systems including and not limited to annular combustor systems.

Referring now to FIG. 2, there is shown generally a combustor 126 for GT system 100 (FIG. 1) including primary combustion stage 108 and optional secondary combustion stage 110. A transition piece 128 flows hot gasses to first stage turbine nozzles 130 and the turbine blades (not shown). As will be described further, an aft frame 190 of transition piece 128 faces downstream towards first stage turbine nozzles 130. Primary combustion stage 108 may include a casing 132, an end cover 134, a first plurality of premixing fuel nozzle 140, a cap assembly 142, a flow sleeve 144, and a combustion liner 146 within flow sleeve 144. An ignition device (not shown) is provided and preferably comprises an electrically energized spark plug. Combustion in primary combustion section 108 occurs within combustion liner 146. Combustion air is directed within combustion liner 146 via flow sleeve 144 and may enter combustion liner 146 through a plurality of holes formed in, for example, cap assembly 142. The air enters combustion liner 146 under a pressure differential and mixes with fuel from start-up fuel nozzles (not shown) and/or first plurality of fuel nozzle 140 within combustion liner 146. Consequently, a combustion reaction occurs within combustion liner 146 releasing heat for the purpose of driving turbine section 120 (FIG. 1). High-pressure air for primary combustion stage 108 may enter flow sleeve 144 and a transition piece impingement sleeve 148, from an annular plenum 150. Compressor 104 (FIG. 1), which is represented by a series of vanes and blades at 152 and a diffuser 154 in FIG. 3, supplies this high-pressure air.

Each of first plurality of fuel nozzles 140 in primary combustion stage 108 can take a variety of forms. In the example of FIG. 2, each fuel nozzle 178 may include a swirler 156, consisting of a plurality of swirl vanes that impart rotation to the entering air and a plurality of fuel spokes 158 that distribute fuel in the rotating air stream. The fuel and air then mix in an annular passage within fuel nozzle 140 before reacting within primary reaction zone 160. However, other forms of (premixing) fuel nozzles 140 may be employed.

As shown in FIG. 2, optional secondary combustion stage 110 may include a second plurality of fuel nozzles 162 for transversely injecting a secondary fuel mixture into a hot gas product of primary combustion stage 108. Fuel nozzles 162 may include any variety and number of injection elements for injecting the second fuel mixture. Fuel nozzles 162 may extend radially into the combustion gas flow path. In one example, four circumferentially spaced fuel nozzles 162 are employed. However, any number may be possible.

Figure 3:
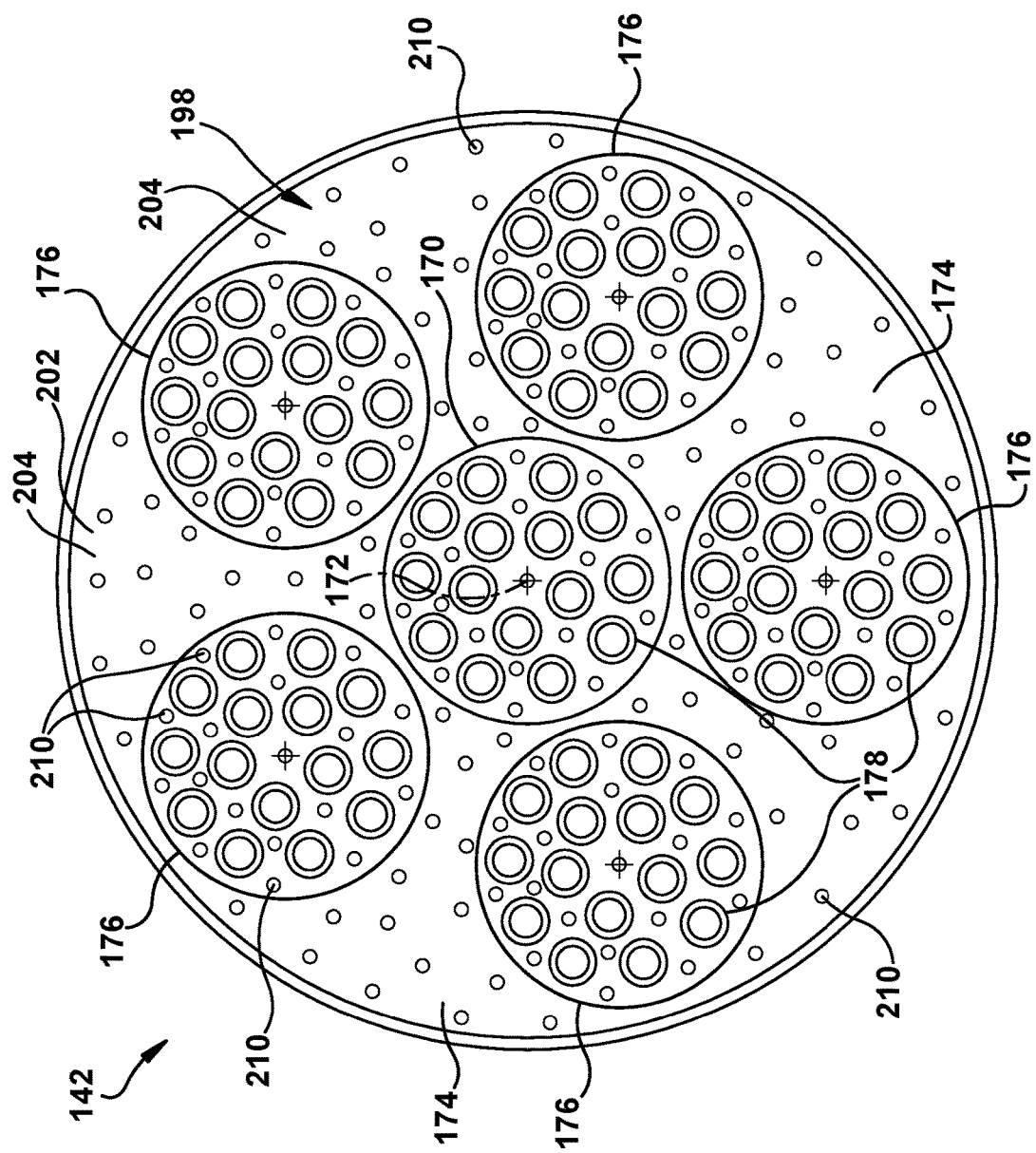
FIG. 3 shows a plan view of an illustrative HGP component in the form of a cap assembly of the combustor of FIG. 2, as viewed from the aft end of the combustor looking upstream, according to a first aspect of the disclosure.
Figure 4:
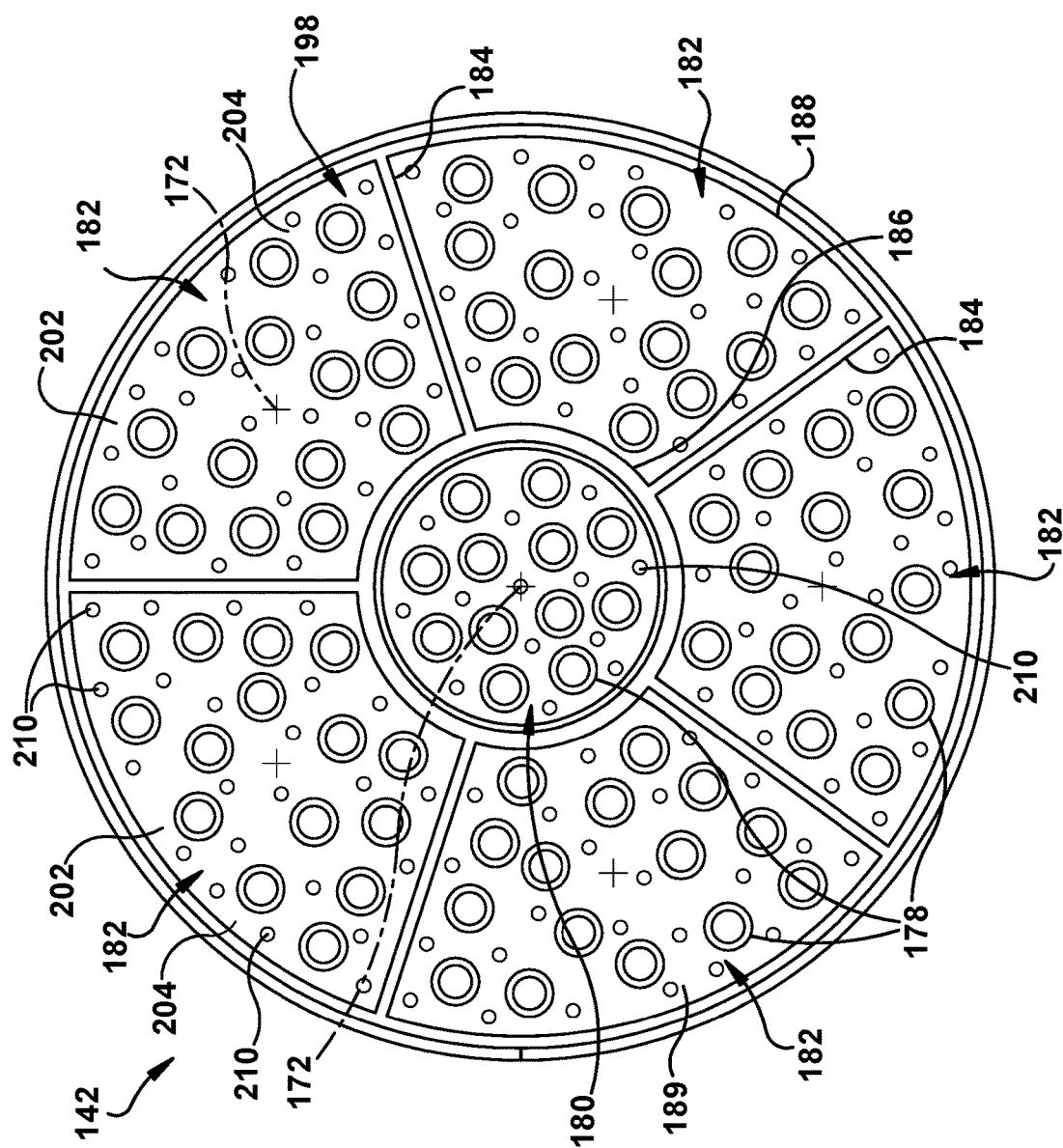
FIG. 4 shows a plan view of an alternate illustrative HGP component in the form of cap assembly of the combustor of FIG. 2, as viewed from the aft end of the combustor looking upstream, according to a second aspect of the disclosure.

With further regard to first plurality of fuel nozzles 140 in FIG. 2, fuel nozzles 140 may have a variety of layouts, e.g., relative to cap assembly 142. FIGS. 3 and 4 are plan views of alternate embodiments of a combustor cap assembly 142, as viewed from an aft end of combustion section 106 looking in an upstream direction. Cap assembly 142 illustrated in FIG. 2 corresponds to that shown in more detail in FIG. 3, although it should be understood that cap assembly 142 illustrated in FIG. 4 is equally well-suited for combustion section 106 shown in FIG. 2.

In FIG. 3, a center fuel nozzle assembly 170, which is disposed about a centerline 172 of combustion section 106, is secured within a respective opening (not separately labeled) in a cap assembly plate 174. A plurality (in this example, five) outer fuel nozzle assemblies 176 are disposed about center fuel nozzle assembly 170 and likewise are secured within respective openings in cap assembly plate 174. Each outer fuel nozzle assembly 176 has a centerline 172. Each fuel nozzle assembly 170, 176 is a bundled tube fuel nozzle assembly having a plurality of parallel, non-concentric fuel nozzles 178, e.g., mixing tubes, that extend through a common fuel plenum. In contrast, in FIG. 4, a center fuel nozzle assembly 180 is surrounded by a plurality (in this case, five) outer fuel nozzle assemblies 182. Each outer fuel nozzle assembly 182 has a truncated wedge shape, such that outer fuel nozzle assemblies 182 may be positioned in close proximity to center fuel nozzle assembly 180 and cover a majority of the head end area. The truncated wedge shape may be defined as having a pair of radial sides 184 that extend in opposite directions and that are joined by a first (radially inner) arcuate side 186 and a second (radially outer) arcuate side 188. Radially outer sides 188 define a radially outer perimeter of fuel nozzle assemblies 182 and, collectively, of cap assembly 142. Each fuel nozzle assembly 182 has a respective centerline 172 radially outward of centerline 172 of center fuel nozzle assembly 180 and combustion section 106. In this illustrative configuration, each fuel nozzle assembly 180, 182 may have its own respective cap assembly plate 189 in a shape corresponding to the shape of outer fuel nozzle assemblies 182 (wedge) or 180 (round). Alternatively, fuel nozzles 178 that are part of each respective fuel nozzle assembly 180, 182 may extend through a common cap assembly plate (not shown). In this configuration, outer fuel nozzle assemblies 182 have respective fuel plenums defining a wedge shape, and center fuel nozzle assembly 180 has a fuel plenum defining a round shape. The upstream ends of fuel nozzles 178 of each fuel nozzle assembly 180, 182 extend through a respective fuel plenum for each fuel nozzle assembly 180, 182. It should be noted that the specific size, spacing, and number of fuel nozzles 178 shown in the Figures (including FIGS. 3 and 4) is intended to be representative of the present bundled tube fuel nozzle assemblies 170, 176, 180, 182 and should not be construed as limiting as having tubes of any particular size, spacing, or number is possible. Moreover, it should be not construed as limiting the present bundled tube fuel nozzles as having tubes with a single tube diameter.

With continuing reference to FIGS. 3 and 4, cap assembly 142 and, more specifically, cap assembly plates 174, 189 may constitute an HGP component 198 including an effusion cooling element 210, according to embodiments of the disclosure. In another embodiment, shown in FIG. 5, HGP component 198 may include an aft frame 190 of transition piece 128 (FIG. 2) of combustor 126 (FIG. 2) upstream of first stage nozzle 130 (FIG. 2) of turbine section 120 (FIG. 1) of the GT system. As will be further described, each of these HGP components 198 include a body with a hot gas path (HGP) surface exposed to the hot gas path.

Figure 6:
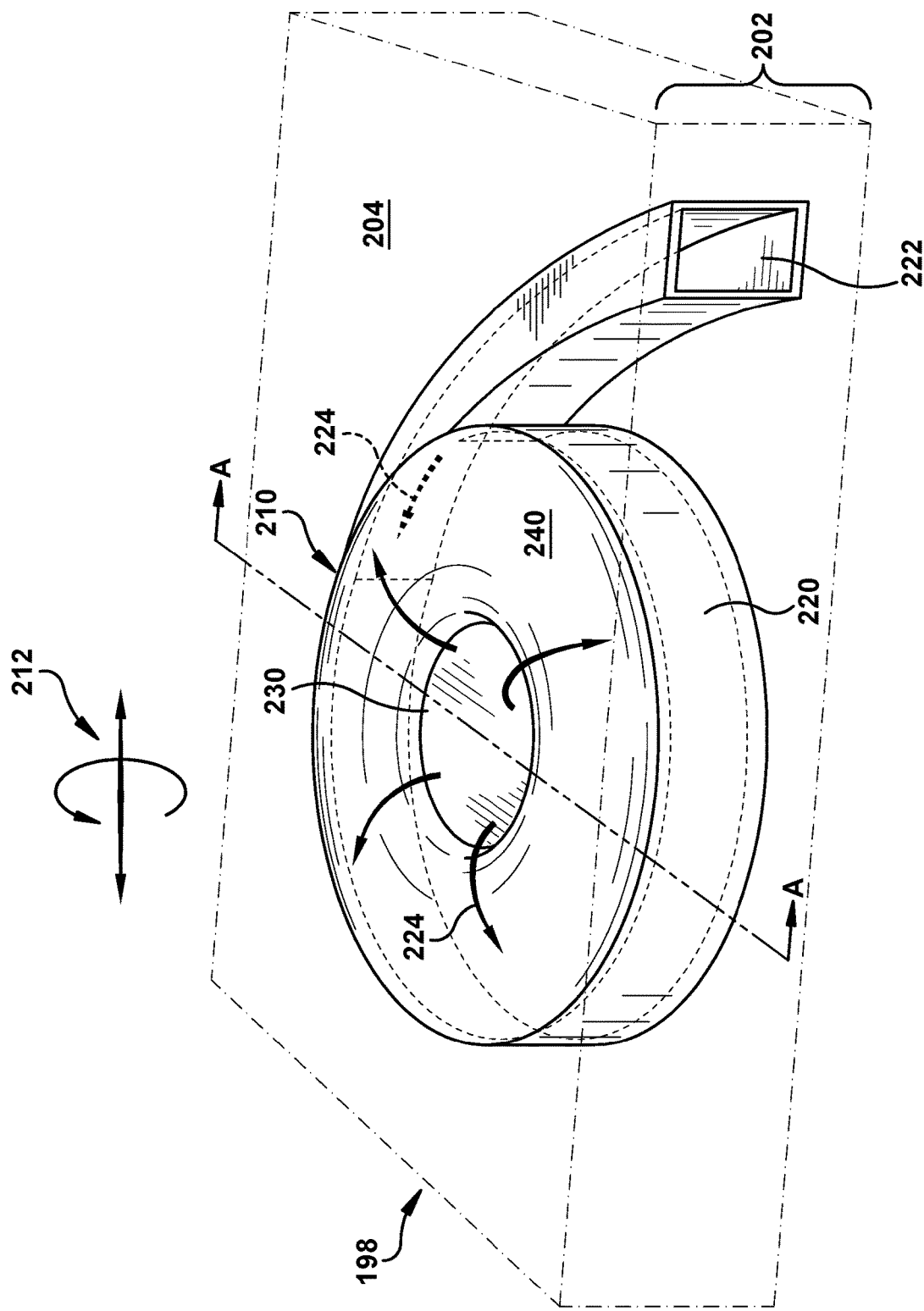
FIG. 6 shows a perspective view of an effusion cooling element for an HGP component, according to embodiments of the disclosure.

FIGS. 6-8 show details of an effusion cooling element 210 in an HGP component 198 according to embodiments of the disclosure. FIG. 6 shows a perspective view of effusion cooling element 210 (hereinafter "cooling element 210" for brevity), FIG. 7 shows a cross-sectional view through line A-A in FIG. 6, and FIG. 8 shows a schematic negative view of, inter alia, cooling element 210. As shown best in FIGS. 6 and 7, HGP component 198 includes a body 202 having a hot gas path (HGP) surface 204 exposed to a hot gas path 212, e.g., of combusted fuel and air. As illustrated, hot gas path 212 may flow over HGP surface 204 and/or recirculate and scrub HGP surface 204. HGP surface 204 is so termed because it is exposed to the hot gasses. In any event, hot gas path 212 may have an extremely high temperature, e.g., >1370° C. (2500° F.), which can cause thermal damage to HGP component 198.

Figure 5:
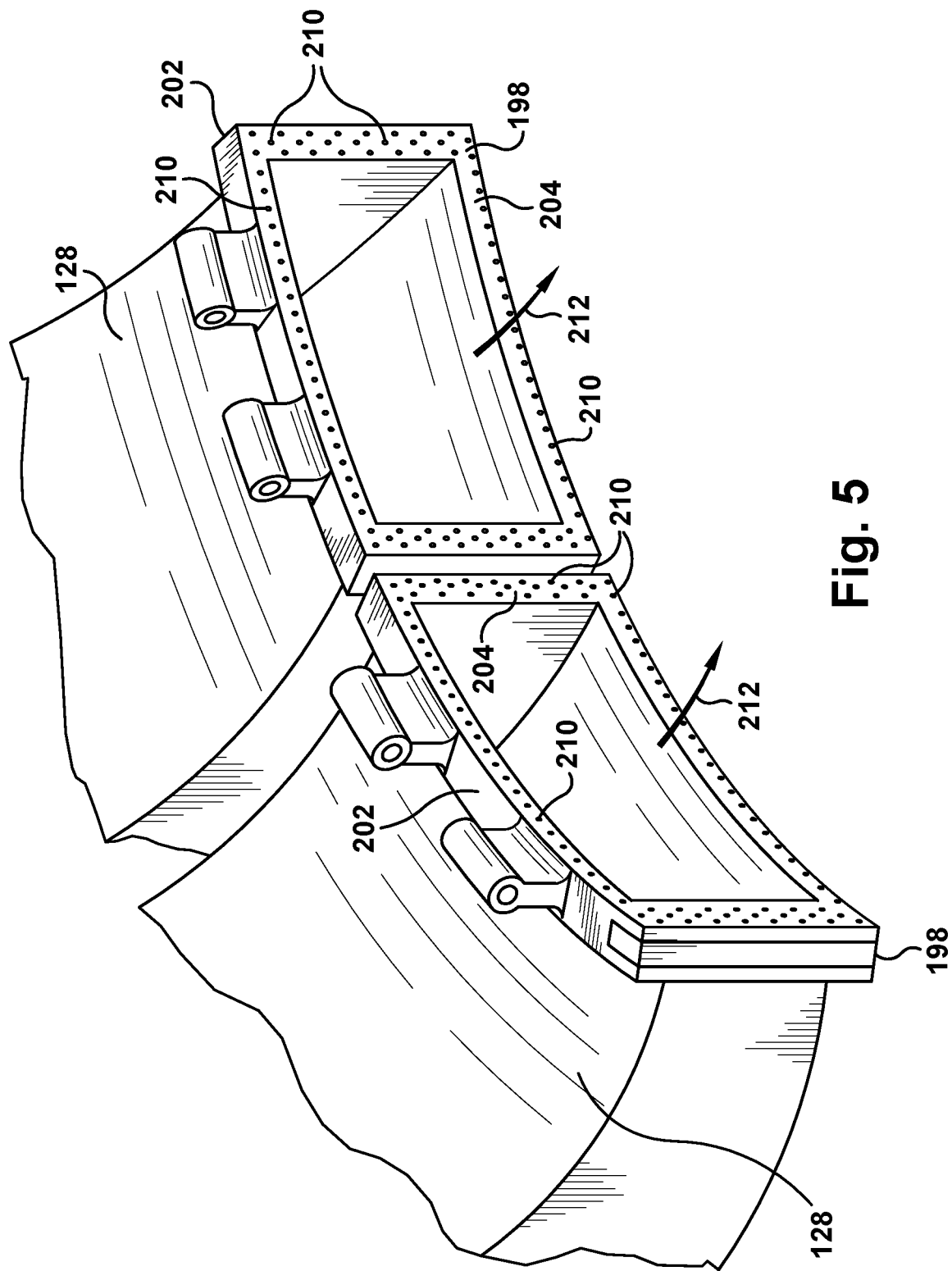
FIG. 5 shows a perspective view of an illustrative HGP component in the form of an aft frame of a transition piece of the combustor of FIG. 2, according to embodiments of the disclosure.

Embodiments of the disclosure will be described relative to two illustrative applications of an HGP component 198: a cap assembly plate 174, 189 (FIGS. 3-4) of combustor 126 (FIG. 2) having a plurality of fuel nozzles 178 (FIGS. 3-4) extending therethrough, and aft frame 190 (FIGS. 2 and 5) of transition piece 128 (FIGS. 2 and 5). It is emphasized however that effusion cooling element 210 can be applied to practically any HGP surface 204 of an HGP component 198. Although not necessarily applicable only in this setting, embodiments of the disclosure may be especially advantageous to HGP surfaces 204 that face in a flow direction of the hot gas path, e.g., facing aft in GT system 100 and exposed to a lower velocity, recirculating hot gas flow. For cap assembly plates 174, 189 (FIGS. 3-4), HGP surface 204 faces downstream reaction zone 160 (FIG. 2), and for aft frame 190, HGP surface 204 faces downstream toward turbine section 120 (FIG. 1). In any case, any number of effusion cooling elements 210 necessary to provide the desired cooling can be provided. For example, as shown in FIGS. 3-4, cap assembly plate 174, 189 of combustor 126 (FIG. 2) may include a plurality of fuel nozzles 178 extending therethrough. In this case, a plurality of effusion cooling elements 210 may be interposed between the plurality of fuel nozzles, i.e., effusion cooling elements 210 are distributed or spaced between the fuel nozzles, as necessary. Similarly, a number of effusion cooling elements 210 can be provided in aft frame 190, as shown in FIG. 5.

As shown in FIGS. 6-8, cooling element 210 is positioned in a body 202 of HGP component. Generally, cooling element 210 may include a coolant swirling chamber 220 embedded within body 202, a coolant delivery passage 222 in body 202 and configured to deliver a coolant 224 to coolant swirling chamber 220, and an effusion opening 230 (FIGS. 5 and 6 only) in HGP surface 204 and in fluid communication with coolant swirling chamber 220. Coolant swirling chamber 220 imparts a centrifugal force to coolant 224. As shown best in FIG. 7, for purposes that will be described, effusion opening 230 has a smaller width W1 than coolant swirling chamber 220 width W2.

Coolant delivery passage 222 is in fluid communication with a source of pressurized coolant, e.g., high-pressure air from compressor 104 (FIG. 1), represented by a series of vanes and blades at 152 and a diffuser 154 in FIG. 2. Coolant delivery passage 222 can be routed to any now known or later developed high pressure coolant plenum in combustor 126, e.g., from any source of high pressure air from compressor 104 (FIG. 1) such as would be delivered by plenum 150 (FIG. 2). For example, where HGP component 198 includes cap assembly plate 174, 189 (FIGS. 2-4), coolant delivery passage 222 may be in fluid communication with any form of combustion air delivery plenum used to deliver high pressure air from annular plenum 150 (FIG. 2) to fuel nozzles 140, 178 (FIGS. 3-4). In another example, where HGP component 198 includes aft frame 190 (FIG. 2), coolant delivery passage 222 may be in fluid communication with annular plenum 150 through which high pressure air from compressor 104 (FIG. 1) is delivered to combustor 126. Coolant delivery passage 222 in body 202 may be configured to deliver coolant 224 to one coolant swirling chamber 210. Alternatively, as shown in FIG. 8, coolant delivery passage 222 may deliver coolant 224 to more than one of cooling element 210. That is, coolant delivery passage 222 in body 202 may be configured to deliver coolant 224 to one or more coolant swirling chambers 220 of one or more of a plurality of effusion cooling elements 210.

Coolant swirling chamber 220 may include any internal-to-body 202 void, space, passage and/or flow path configured to impart a rotating or swirling motion to coolant 224 introduced thereto, and create a centrifugal force on coolant 224. In one embodiment, shown in FIG. 6, coolant swirling chamber(s) 220 may have a rounded cross-section, e.g., oval, oblong, ellipse, circular, etc., as sectioned parallel with HGP surface 104. In one particular embodiment, shown in FIGS. 8 and 9, coolant swirling chamber(s) 220 may have a substantially circular cross-section as sectioned parallel with HGP surface 104. As shown in FIG. 7 along line A-A in FIG. 6, coolant swirling chamber(s) 220 may have a polygonal (e.g., square, rectangular) cross-section as sectioned perpendicular with HGP surface 204. However, this cross-section need not be polygonal as other shapes, e.g., oval, ellipse, etc., may also be employed.

As shown FIGS. 6-7, in one embodiment, coolant delivery passage 222 in body 202 delivers coolant 224 to an interior 240 of coolant swirling chamber 220 at a tangent to the rounded cross-section of coolant swirling chamber 220 such that coolant 224 swirls around the interior 240 prior to exiting the effusion opening 230. That is, coolant delivery passage 222 has a flow path direction where it terminates into chamber 220 and touches a curve r curved surface of the chamber at a point, but if extended would not cross the curve or curved surface at that point. By virtue of the tangential configuration, coolant 224 is introduced in a manner that it interacts with interior 240 to rotate or swirl, imparting a centrifugal force to coolant 224 and causing coolant 224 to want to move outwardly from the center.

As shown in the cross-sectional plan view of FIG. 9, more than one coolant delivery passage 222A, 222B may introduce coolant 224 to a single coolant swirling chamber 220 (effusion opening 230 shown in phantom). That is, coolant delivery passage 222, e.g., via a number of sub-passages 222A, 222B that perhaps feed from a common manifold 242, may deliver coolant 224 to coolant swirling chamber 229 at a first circumferential location 244 of coolant swirling chamber 220 and at a second circumferential location 246 of coolant swirling chamber 220. Although not necessary in all instances, in one embodiment, second circumferential location 246 may be diametrically opposed to first circumferential location 244. In any event, each sub-passage 222A, 222B introduces coolant 224 in the same rotational direction, e.g., clockwise or counter-clockwise. Use of more than one coolant delivery passage 222 may allow for, for example, creation of a more uniform centrifugal force in coolant 224. Again, by virtue of the tangential configuration, coolant 224 is introduced in a manner that it interacts with interior 240 to rotate or swirl, imparting a centrifugal force to coolant 224 and causing coolant 224 to want to move outwardly from the center.

Returning to FIGS. 6 and 7, each effusion cooling element 210 includes an effusion opening 230 in HGP surface 204 and in fluid communication with a respective coolant swirling chamber 220. As shown best in the cross-section of FIG. 7, effusion opening 230 has a smaller width W1 than coolant swirling chamber 220 width W2, which acts to retain and direct coolant 224 within coolant swirling chamber 220 to create the centrifugal force. Each effusion opening 230 is centered over a respective coolant swirling chamber 220. As shown in FIG. 6, effusion opening 230 can include a rounded mating surface 232 with HGP surface 204, e.g., rounded, chamfered, etc. Alternatively, in FIG. 7, effusion opening 230 can include a squared mating with HGP surface 204, e.g., as though drilled into HGP surface 204. (Although FIG. 7 is a cross-section of FIG. 6, the different mating surfaces are one difference between the figures).

HGP component 198 with effusion cooling element 210 can be formed in a number of ways. In one embodiment, shown in FIG. 6, HGP component 198 and, in particular, body 202 and effusion cooling element 210 may be additively manufactured as a unitary part. Additive manufacturing (AM) includes a wide variety of processes of producing an HGP component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Here, HGP component 198, or at least the portion including effusion cooling element 210, may be made by a metal powder additive manufacturing technique, such as but not limited to: direct metal laser melting (DMLM) (also referred to as selective laser melting (SLM)). As understood in the field, in DMLM, metal powder layers are sequentially melted together to form the component.

Figure 10:
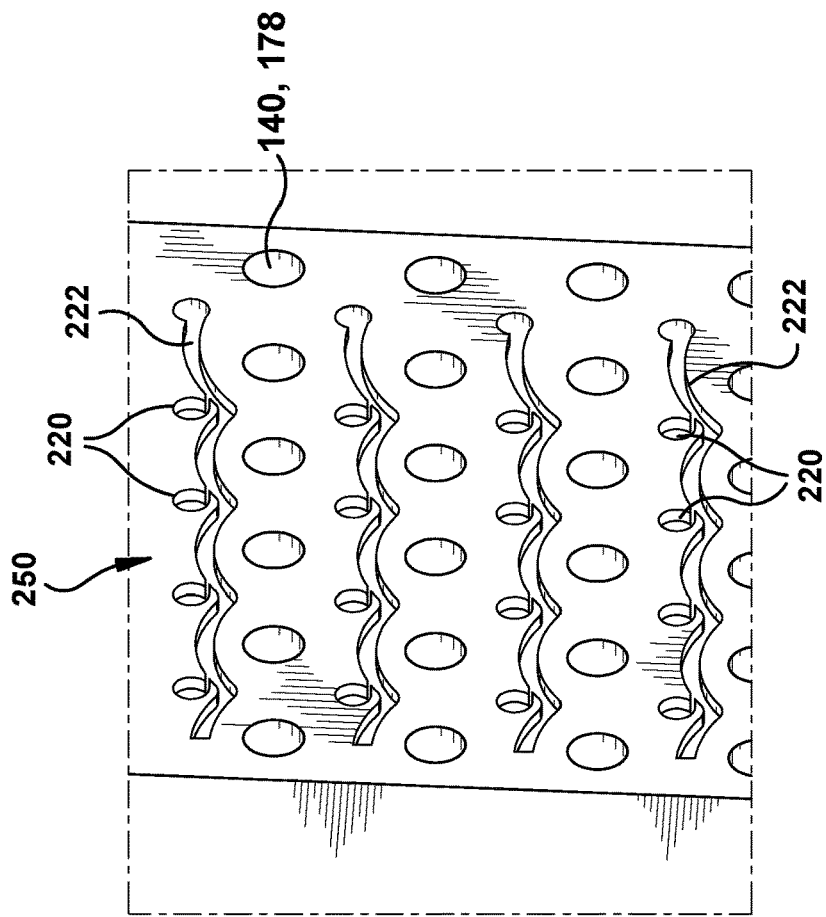
FIG. 10 shows a perspective view of a first member of an HGP component includes parts of an effusion cooling element, according to embodiments of the disclosure.
Figure 11:
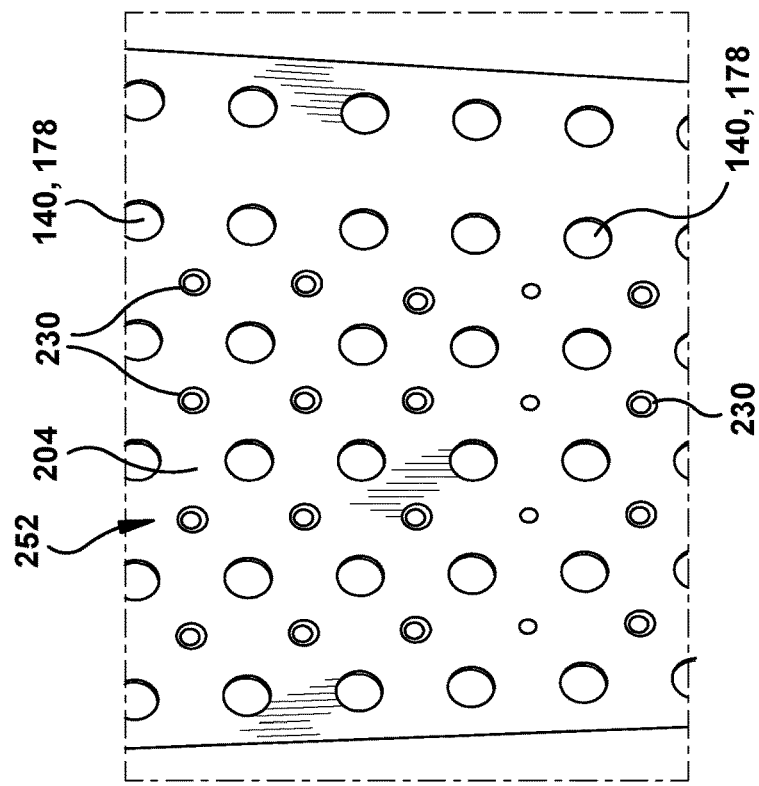
FIG. 11 shows a perspective view of a second member of an HGP component includes parts of an effusion cooling element, according to embodiments of the disclosure.

In another embodiment, shown in FIGS. 7, 10 and 11, body 202 includes a first member 250 and a second member 252 for mating coupling to first member 250. As shown in FIGS. 7 and 10, first member 250 includes coolant delivery passage 222 and coolant swirling chamber 220, and as shown in FIGS. 7 and 11, second member 252 includes effusion opening 230 and HGP surface 204. FIG. 7 shows that first member 250 and second member 252 are coupled together in an aligned fashion, e.g., using fasteners or otherwise, to create effusion cooling element(s) 210. FIGS. 10 and 11 show first and second member 250, 252 in a cap assembly plate 174, 189 (FIGS. 3-4) application, but this form of manufacture is equally applicable to other applications. In one embodiment, first and second member 250, 252 can both be made of the same metal or metal alloy and, e.g., welded together. In this case, coolant delivery passage 222, coolant swirling chamber 220, effusion opening 230 may be made by any known or later developed metal component manufacturing techniques, e.g., additive manufacture, milling, etc. Alternatively, first and second member 250, 252 may include different materials. In one example, first member 250 may include a metal and second member 252 may include a ceramic pre-sintered preform (PSP) plate (with effusion opening(s) 230 therein). Here, first member 250 can be made by any known or later developed metal component manufacturing techniques, e.g., additive manufacture, milling, etc., and second member 252 can be made by any now known or later developed ceramic component forming techniques, e.g., ceramic ply layup, ceramic slurry impregnation and hardening; or ceramic plate formation with water jet formation of openings 230, etc. In this latter option, first metal member 250 and second member 252 (ceramic PSP plate) can be brazed together.

In operation, coolant 224 is introduced into coolant swirling chamber 220, as described herein, by coolant delivery passage(s) 222. In coolant swirling chamber 220, coolant 224 follows a swirling or rotational path and is imparted with a centrifugal force. Coolant 224 is directed and contained by coolant swirling chamber 220, including an interior surface 270 (FIG. 7) of coolant swirling chamber 220 created by effusion opening 230 having smaller width W1 than coolant swirling chamber 220 width W2. Effusion opening 230 is centered over coolant swirling chamber 220. As shown best in FIG. 6, due to the centrifugal force applied, coolant 224 exits effusion opening 230 over substantially all of 360° about effusion opening 230, e.g., with no more than a cumulative 10° not receiving coolant 224. Thus, coolant 224 exits effusion opening 230 onto HGP surface 204 radially in all directions, and expands outwardly over HGP surface 204, thereby producing a thin coolant film on HGP surface 224. The thin coolant film is more uniformly distributed and provides improved and cooling compared to the film created by conventional openings that are unidirectional. An increased centrifugal velocity of coolant 224 exiting effusion opening 230 will yield a stronger and more defined coolant film around the opening. The shape of effusion opening 230 also effects the film size and strength, e.g., with chamfered/rounded edges requiring less rotation to have the same impact. Adjacent effusion cooling elements 210 may have coolant exit in a co-rotating or counter-rotating direction to create the desired cooling effect. Use of effusion cooling elements 210 can enable significant cooling of HGP components 198, and in particular, aft facing HGP surfaces 204. Further, effusion cooling elements 210 can extend HGP component 198 life and service intervals.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A combustion cap for a combustor, comprising:
    a body including a hot gas path (HGP) surface exposed to a hot gas path; and
    effusion cooling elements in the body, the effusion cooling elements including:
    a plurality of coolant swirling chambers embedded within the body,
    a coolant delivery passage in the body configured to deliver a coolant to each of the plurality of coolant swirling chambers,
    the coolant delivery passage including a plurality of sequentially coupled arcuate segments, each of the sequentially coupled arcuate segments circumventing a respective one of a plurality of fuel nozzles extending through the body,
    wherein each of the plurality of coolant swirling chambers imparts a centrifugal force to the coolant, and
    a plurality of effusion openings in the HGP surface, each of the plurality of effusion openings in fluid communication with a respective one of the plurality of coolant swirling chambers, and
    each of the plurality of effusion openings having a smaller width than the respective one of the plurality of coolant swirling chambers.

2. The combustion cap of claim 1, wherein the coolant delivery passage is in fluid communication with a source of coolant, wherein the source transmits the coolant to the coolant delivery passage.

3. The combustion cap of claim 1, wherein the body includes a cap assembly plate of the combustor having the plurality of fuel nozzles extending therethrough, and the plurality of effusion openings are interposed between the plurality of fuel nozzles.

4. The combustion cap of claim 1, wherein the coolant exits the plurality of effusion openings over substantially all of 360° about each of the plurality of effusion openings, creating a coolant film on the HGP surface.

5. The combustion cap of claim 1, wherein each of the plurality of effusion openings includes a rounded mating surface with the HGP surface.

6. The combustion cap of claim 1, wherein each of the plurality of coolant swirling chambers has a rounded cross-section, and wherein the coolant delivery passage in the body delivers the coolant to an interior of each of the plurality of coolant swirling chambers at a tangent to the rounded cross-section of each of the plurality of coolant swirling chambers such that the coolant swirls around the interior prior to exiting the respective one of the plurality of effusion openings.

7. The combustion cap of claim 1, wherein the body includes a first member including the coolant delivery passage and the plurality of coolant swirling chambers, and a second member for mating coupling to the first member, the second member including the plurality of effusion openings and the HGP surface.

8. The combustion cap of claim 7, wherein the first member includes a metal and the second member includes a ceramic pre-sintered preform (PSP) plate.

9. The combustion cap of claim 1, wherein the body and the effusion cooling elements are additively manufactured as a unitary part.

10. The combustion cap of claim 1, wherein each of the plurality of coolant swirling chambers has a substantially circular cross-section, and the coolant delivery passage delivers the coolant to each of the plurality of coolant swirling chambers at a first circumferential location of each of the plurality of coolant swirling chambers.

11. The combustion cap of claim 1, wherein the HGP surface faces in a flow direction of the hot gas path.

12. The combustion cap of claim 1, wherein at least one of the plurality of coolant swirling chambers is substantially equidistant from a selected group of the plurality of fuel nozzles on the HGP surface.

13. The combustion cap of claim 1, wherein the coolant delivery passage is fluidly isolated from at least one other coolant delivery passage in the body.

14. The combustion cap of claim 1, wherein each of the plurality of effusion openings extends perpendicularly with respect to an orientation of the coolant delivery passage within the body.

15. A gas turbine (GT) system, comprising:
    a compressor;
    a combustion section including a plurality of combustors for creating a flow of hot gasses that travels along a hot gas path,
    each combustor of the plurality of combustors including a combustion cap,
    each combustion cap including a body having a hot gas path (HGP) surface exposed to the hot gas path;
    a turbine section downstream of the combustion section, the turbine section receiving the flow of hot gasses; and
    each body of each combustion cap comprising effusion cooling elements, the effusion cooling elements of each body including:
    a plurality of coolant swirling chambers embedded within the body,
    a coolant delivery passage in the body configured to deliver a coolant to each of the plurality of coolant swirling chambers,
    the coolant delivery passage including a plurality of sequentially coupled arcuate segments,
    each of the plurality of sequentially coupled arcuate segments circumventing a respective one of a plurality of fuel nozzles extending through the body;

wherein the coolant delivery passages of each body is in fluid communication with a source of coolant that transmits the coolant to each of the coolant delivery passages, wherein each of the plurality of coolant swirling chambers imparts a centrifugal force to the coolant, wherein a plurality of effusion openings are formed in the HGP surface of each body, each of the plurality of effusion openings in fluid communication with a respective one of the plurality of coolant swirling chambers, and each of the plurality of effusion openings having a smaller width than the respective one of the plurality of coolant swirling chambers, and wherein the coolant exits the plurality of effusion openings over substantially all of 360° about each of the plurality of effusion openings, creating a coolant film on the HGP surface.

16. The GT system of claim 15, wherein each body includes a first metal member including the coolant delivery passage of the body and the plurality of coolant swirling chambers of the body, and a second ceramic pre-sintered preform (PSP) plate member for mating coupling to the first metal member, the second ceramic PSP plate member including the plurality of effusion openings of the body and the HGP surface of the body.

17. The GT system of claim 15, wherein each body and the effusion cooling elements of the body are additively manufactured as a unitary part.

18. The GT system of claim 15, wherein the HGP surface of each body faces in a flow direction of the hot gas path.

* * * * *